United States Patent
Smith

(10) Patent No.: US 12,421,899 B2
(45) Date of Patent: Sep. 23, 2025

(54) DUAL CYCLE INTERCOOLED HYDROGEN ENGINE ARCHITECTURE

(71) Applicant: PRATT & WHITNEY CANADA CORP., Longueuil (CA)

(72) Inventor: Scott Smith, St-Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/735,712

(22) Filed: Jun. 6, 2024

(65) Prior Publication Data

US 2024/0328355 A1 Oct. 3, 2024

Related U.S. Application Data

(60) Continuation of application No. 18/090,152, filed on Dec. 28, 2022, now Pat. No. 12,037,946, which is a
(Continued)

(51) Int. Cl.
*F02C 7/224* (2006.01)
*F02C 3/20* (2006.01)
(Continued)

(52) U.S. Cl.
CPC ............... *F02C 7/143* (2013.01); *F02C 3/20* (2013.01); *F02C 7/16* (2013.01); *F02C 7/22* (2013.01);
(Continued)

(58) Field of Classification Search
CPC .... F02C 7/143; F02C 7/16; F02C 7/18; F02C 7/22; F02C 7/224; F02C 3/20; F02C 3/22;
(Continued)

(56) References Cited

U.S. PATENT DOCUMENTS

| | | |
|---|---|---|
| 4,062,184 A | 12/1977 | Hagen |
| 5,154,045 A | 10/1992 | Saruwatari et al. |

(Continued)

FOREIGN PATENT DOCUMENTS

| | | |
|---|---|---|
| GB | 998888 A | 7/1965 |
| GB | 201903881 A | 3/2019 |

(Continued)

OTHER PUBLICATIONS

Liquid Hydrogen as a Propulsion Fuel 1945-1959, John L. Sloop, The NASA History Series (1978) (341 pages).

*Primary Examiner* — William H Rodriguez
(74) *Attorney, Agent, or Firm* — NORTON ROSE FULBRIGHT CANADA LLP

(57) ABSTRACT

In one aspect of the present disclosure, there is provided a gas turbine engine. The gas turbine engine includes a primary gas path having, in fluid series communication: an air inlet, a compressor fluidly connected to the air inlet, a combustor fluidly connected to an outlet of the compressor, and a turbine section fluidly connected to an outlet of the combustor section. In embodiments, a hydrogen expansion turbine is in fluid communication to receive hydrogen from the gaseous hydrogen outlet of the heat exchanger. In certain embodiments, the gas turbine engine includes a heat exchanger having a gas conduit fluidly connected to the primary gas path, and a fluid conduit in fluid isolation from the gas conduit and in thermal communication with the gas conduit.

13 Claims, 3 Drawing Sheets

Related U.S. Application Data division of application No. 17/331,942, filed on May 27, 2021, now Pat. No. 11,542,869.

(51) Int. Cl.
*F02C 7/143* (2006.01)
*F02C 7/16* (2006.01)
*F02C 7/22* (2006.01)
*F02C 7/36* (2006.01)
*F02C 9/26* (2006.01)
*F02C 3/04* (2006.01)
*F02C 7/32* (2006.01)

(52) U.S. Cl.
CPC ................ *F02C 7/224* (2013.01); *F02C 7/36* (2013.01); *F02C 9/263* (2013.01); *F02C 3/04* (2013.01); *F02C 7/32* (2013.01)

(58) Field of Classification Search
CPC ............... F02C 9/263; F05D 2260/211; F05D 2260/213
See application file for complete search history.

(56) References Cited

U.S. PATENT DOCUMENTS

| | | |
|---|---|---|
| 5,154,051 A | 10/1992 | Mouritzen |
| 5,347,806 A | 9/1994 | Nakhamkin |
| 6,438,937 B1 | 8/2002 | Pont et al. |
| 7,246,482 B2 | 7/2007 | Mahoney et al. |
| 9,249,723 B2 | 2/2016 | Gulen |
| 10,989,117 B2 | 4/2021 | Roberge |
| 11,448,133 B2 * | 9/2022 | Cocks ............... F02C 3/22 |
| 11,542,869 B2 | 1/2023 | Smith |
| 11,692,491 B1 | 7/2023 | Hanrahan et al. |
| 11,885,260 B2 * | 1/2024 | Boucher ............... F02C 7/36 |
| 12,037,946 B2 * | 7/2024 | Smith ............... F02C 7/16 |
| 2009/0288421 A1 | 11/2009 | Zeiner et al. |
| 2009/0314002 A1 | 12/2009 | Libera et al. |
| 2011/0023444 A1 | 2/2011 | Veilleux |
| 2011/0247315 A1 | 10/2011 | Rhoden |
| 2016/0123226 A1 | 5/2016 | Razak |
| 2020/0088099 A1 | 3/2020 | Roberge |
| 2020/0088102 A1 | 3/2020 | Roberge |
| 2020/0102882 A1 | 4/2020 | Gerard et al. |
| 2021/0348561 A1 * | 11/2021 | Cocks ............... F02C 7/12 |
| 2022/0099299 A1 | 3/2022 | Carrotte et al. |
| 2023/0120297 A1 * | 4/2023 | Butler ............... H01M 8/04201 290/52 |

FOREIGN PATENT DOCUMENTS

| | | |
|---|---|---|
| WO | 2015/191100 A1 | 12/2015 |
| WO | 2018059804 A1 | 4/2018 |

* cited by examiner

DUAL CYCLE INTERCOOLED HYDROGEN ENGINE ARCHITECTURE

CROSS-REFERENCE TO RELATED APPLICATIONS

This is a continuation of U.S. patent application Ser. No. 18/090,152 filed Dec. 28, 2022, which is a divisional of U.S. patent application Ser. No. 17/331,942 filed May 27, 2021, granted as U.S. Pat. No. 11,542,869, the entire content of each of which is incorporated by reference herein.

TECHNICAL FIELD

The present disclosure relates generally to gas turbine engines, and more particularly to gas turbine engines with intercooling. There is always a need in the art for improvements to engine architecture in the aerospace industry.

SUMMARY

In one aspect of the present disclosure, there is provided a gas turbine engine. The gas turbine engine includes a primary gas path having, in fluid series communication: an air inlet, a compressor fluidly connected to the air inlet, a combustor fluidly connected to an outlet of the compressor, and a turbine section fluidly connected to an outlet of the combustor section. The turbine section is operatively connected to the compressor to drive the compressor; and an output shaft is operatively connected to the turbine section to be driven by the turbine section. In certain embodiments, the gas turbine engine includes a heat exchanger having a gas conduit fluidly connected to the primary gas path, and a fluid conduit in fluid isolation from the gas conduit and in thermal communication with the gas conduit, the fluid conduit having a liquid hydrogen inlet and a gaseous hydrogen outlet fluidly connected to the liquid hydrogen inlet.

In certain embodiments, the gas turbine engine includes an expansion turbine having a gas inlet fluidly connected to the gaseous hydrogen outlet and a gas outlet fluidly connected to the gas inlet, the gas outlet of the expansion turbine being fluidly connected to the combustor. In certain embodiments, the compressor has multiple compressor sections and the gas conduit of the heat exchanger is fluidly connected to the primary gas path at a location between adjacent compressor sections of the multiple compressor sections.

In certain embodiments, a liquid hydrogen pump is fluidly connected to the liquid hydrogen inlet of the heat exchanger and operable to supply liquid hydrogen to the liquid hydrogen inlet of the heat exchanger. In certain embodiments the gas turbine engine can include one or both of: a gaseous hydrogen accumulator downstream of the heat exchanger relative to hydrogen flow, such that the gaseous hydrogen accumulator is between the heat exchanger and the combustor, and a gaseous hydrogen meter downstream of the gaseous hydrogen accumulator relative to hydrogen flow for controlling flow of hydrogen to the combustor, such that the gaseous hydrogen meter is between the accumulator and the combustor.

In certain embodiments, the expansion turbine is operatively connected to the output shaft to drive the output shaft in parallel with the turbine section. In certain embodiments, the gas turbine engine includes a gearbox, where the gear box is operatively connected to a main shaft driven by a turbine section of the gas turbine engine. The gearbox can further include an output shaft driven by combined power from the turbine section and the expansion turbine. In certain embodiments, an outlet of the hydrogen expansion turbine is in fluid communication with the combustor to provide combustor ready hydrogen gas to the combustor and to add additional rotational power to the gearbox.

In certain embodiments, the expansion turbine is operatively connected to one or both of: an electrical power generator to drive the electrical power generator, and an auxiliary air compressor to drive the auxiliary air compressor.

In certain embodiments, a controller is operatively connected to the gaseous hydrogen meter and at least one sensor in any of the gearbox, the hydrogen expansion turbine, and/or the turbine section, The controller can include machine readable instructions that cause the controller to receive input for a command power, receive input from at least one of the gearbox, the hydrogen expansion turbine, and/or the turbine section, adjust the flow of gaseous hydrogen via the gaseous hydrogen meter to achieve the command power.

In another aspect of the present disclosure, there is provided a primary gas path having, in fluid series communication: an air inlet, a compressor fluidly connected to the air inlet, a combustor fluidly connected to an outlet of the compressor, and a turbine section fluidly connected to an outlet of the combustor, the turbine section operatively connected to the compressor to drive the compressor, wherein the compressor has multiple compressor sections. An output shaft is operatively connected to the turbine section to be driven by the turbine section. The gas turbine engine includes a heat exchanger having a gas conduit fluidly connected to the primary gas path, and a fluid conduit in fluid isolation from the gas conduit and in thermal communication with the gas conduit, the fluid conduit having a liquid hydrogen inlet and a gaseous hydrogen outlet fluidly connected to the liquid hydrogen inlet, wherein and gas conduit of the heat exchanger is fluidly connected to the primary gas path at a location between adjacent compressor sections of the multiple compressor sections. In certain embodiments, the compressor, combustor, and turbine section are part of one of: a gas turbine engine, a reciprocating heat engine, and a rotary heat engine.

In certain embodiments, a liquid hydrogen pump is in fluid communication with the liquid hydrogen inlet of the heat exchanger, where the combustor is also in fluid communication to receive hydrogen downstream of the heat exchanger relative to hydrogen flow for combustion of hydrogen and air.

In certain embodiments, the gas turbine engine includes a hydrogen expansion turbine in fluid communication to receive hydrogen from the gaseous hydrogen outlet of the heat exchanger, the expansion turbine including a rotatable component operatively connected to the expansion turbine to be rotated by rotation of the expansion turbine where the rotatable component is also operatively connected to a gearbox. In certain embodiments, an outlet of the hydrogen expansion turbine is in fluid communication with the combustor to provide combustor ready hydrogen gas to the combustor and to add additional rotational power to the gearbox.

In certain embodiments, the gas turbine engine includes a gaseous hydrogen accumulator downstream of the heat exchanger relative to hydrogen flow where the gaseous hydrogen accumulator is between the heat exchanger and the combustor. In certain embodiments, the gas turbine engine includes a gaseous hydrogen meter downstream of the gaseous hydrogen accumulator relative to hydrogen flow for controlling flow of hydrogen to the combustor, wherein the gaseous hydrogen meter is between the accumulator and the combustor.

In yet another aspect of the present disclosure, there is provided a method of operating an aircraft. The method comprises, expanding a flow of liquid hydrogen to a flow of gaseous hydrogen, extracting kinetic energy from the flow of gaseous hydrogen to rotate a rotatable component of the aircraft, after the extracting, combusting the flow of gaseous hydrogen in a combustor of a gas turbine engine of the aircraft. In certain embodiments, using rotation of the rotatable component, generating one or both of: thrust, and electrical power.

In embodiments, the method includes extracting power from a flow of gaseous hydrogen with a hydrogen expansion turbine downstream of the heat exchanger. In certain embodiments, the method includes combining power from the expansion turbine with power from a main shaft driven by a turbine section to drive an output shaft. In certain embodiments, the method includes receiving input from at least one of the gearbox, a hydrogen expansion turbine, and/or the turbine section, and outputting a command to the gaseous hydrogen meter to achieve a command power output at the output shaft.

In certain embodiments, the method includes retrofitting a gas turbine engine with a dual cycle intercooled architecture. In certain such embodiments, retrofitting can include introducing a liquid hydrogen supply, introducing the heat exchanger to a duct between the first stage compressor and the second stage compressor, introducing a gaseous hydrogen accumulator and a gaseous hydrogen meter between the heat exchanger and the second stage compressor, and introducing an expansion turbine between the heat exchanger and the gaseous hydrogen accumulator, the expansion turbine operatively connected to a gear box. In certain such embodiments, retrofitting can further include connecting the liquid hydrogen supply to the heat exchanger via a liquid hydrogen pump in a first line, connecting the heat exchanger to the expansion turbine via a second line, and connecting the expansion turbine to the second stage compressor via a third line, wherein the gaseous hydrogen accumulator and gaseous hydrogen meter are disposed in the third line.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
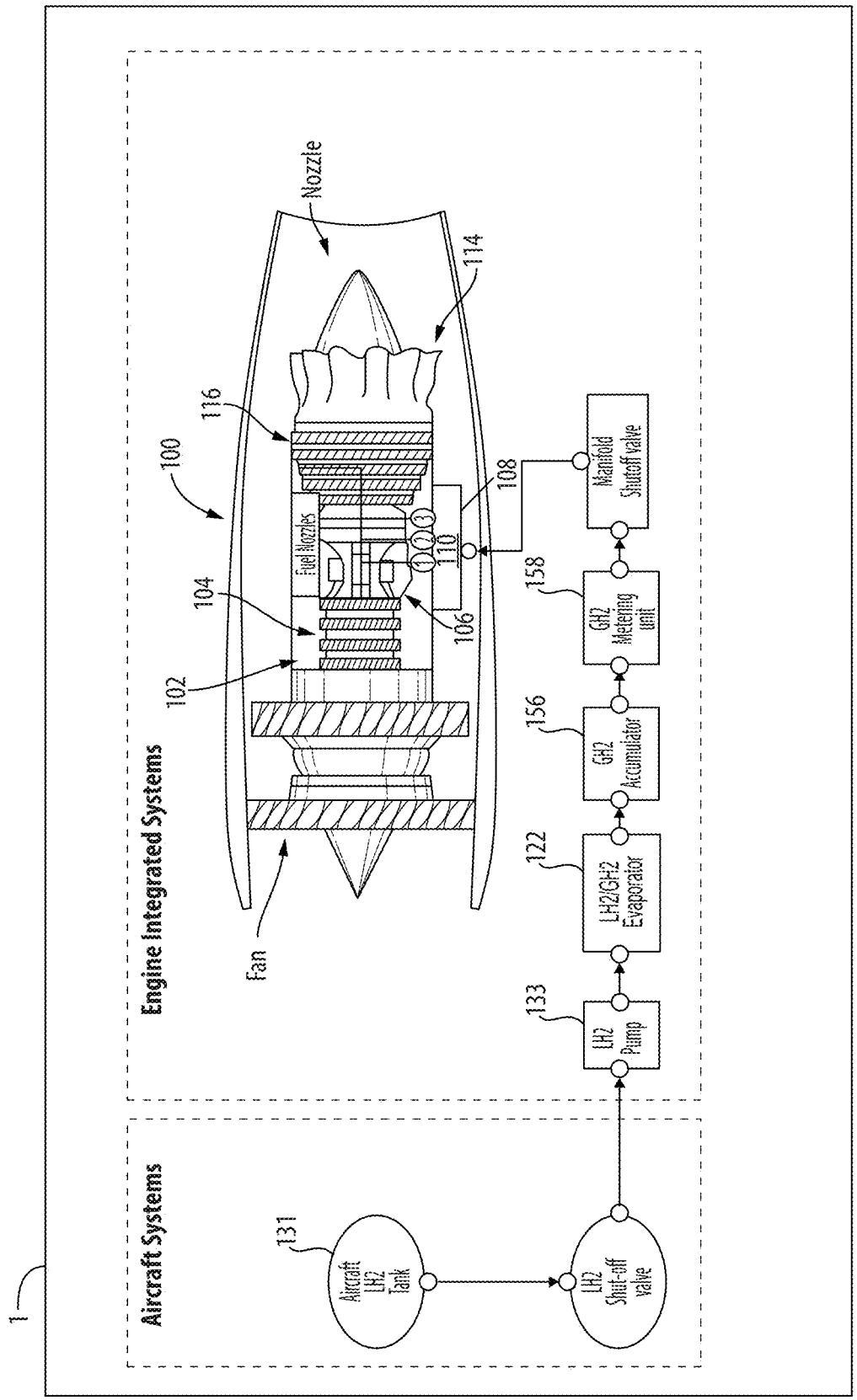
FIG. 1 is a schematic view of an embodiment of an aircraft in accordance with this disclosure.
Figure 2:
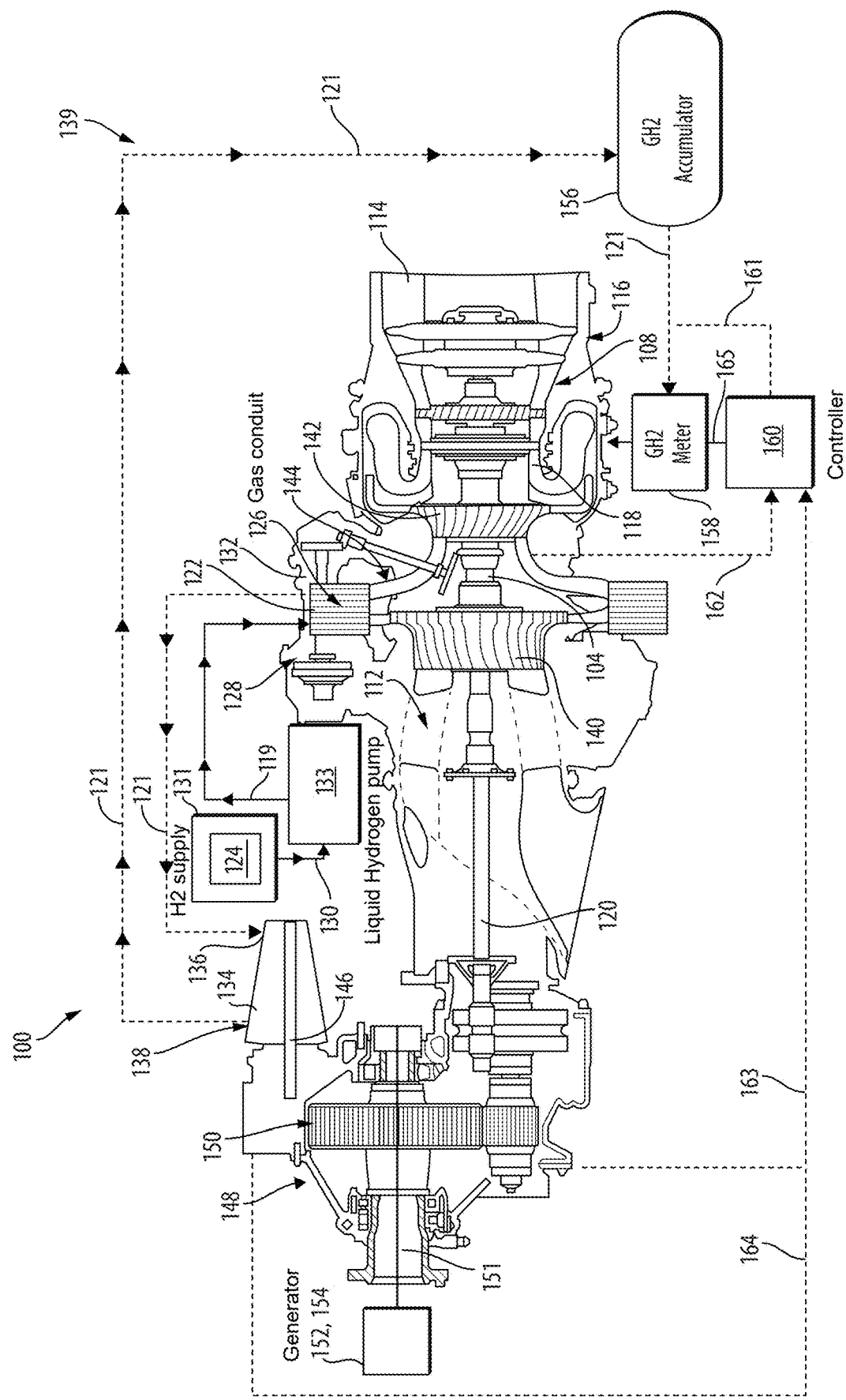
FIG. 2 is a schematic diagram of an embodiment of a gas turbine engine constructed in accordance with the present disclosure, showing a dual cycle intercooled engine architecture.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments and/or aspects of this disclosure are shown in FIG. 2. The systems and methods described herein can be used to improve engine efficiency, reduce carbon emissions, and improve power to weight ratio.

Traditionally, hydrocarbon fuels are used to power gas turbine engines, however, it is possible to use a variety of fuels for the combustion portion of the Brayton Cycle, for example pure hydrogen, non-hydrocarbon fuels, or mixes. When hydrogen is used as the fuel, it is possible to operate the gas turbine engine with little or no pollutants in the exhaust. Moreover, various means of intercooling/evaporating are also possible when using hydrogen fuel, as described and contemplated herein. As a non-limiting example, such means of intercooling/evaporating may include in-situ precoolers in the engine inlet or axial intercoolers between axial compressors.

In certain embodiments, referring to FIG. 1, an aircraft 1 can include an engine 100, where the engine can be a propulsive energy engine (e.g. creating thrust for the aircraft 1), or a non-propulsive energy engine, and a fuel system 100. As described herein, the engine 100 is a turbofan engine, although the present technology may likewise be used with other engine types. The engine 100 includes a compressor section 102 having a compressor 104 in a primary gas path 106 to supply compressed air to a combustor 108 of the aircraft engine 100, the primary gas path 106 including fluidly in series the combustor 108 and nozzle manifold 110 for issuing fluid to the combustor 108.

More specifically the primary gas path 106 includes, in fluid series communication: an air inlet 112, the compressor 104 fluidly connected to the air inlet 112, the combustor 108 fluidly connected to an outlet 114 of the compressor 104, and a turbine section 116 fluidly connected to an outlet 118 of the combustor 108, the turbine section 116 operatively connected to the compressor 104 to drive the compressor 104.

A main output shaft 120 is operatively connected to the turbine section 116 to be driven by the turbine section 116. A heat exchanger 122 is fluidly connected between a liquid hydrogen supply 124 and the compressor 104. A gas conduit 126 is fluidly connected to the primary gas path 106, and a fluid conduit 128, carrying liquid hydrogen from the liquid hydrogen supply 124, in thermal communication with the gas conduit 126, but is fluidly isolated from the gas conduit 126, fluidly connects the liquid hydrogen supply 124 to the primary gas path 106.

The fluid conduit 128 has a liquid hydrogen inlet 130 and a gaseous hydrogen outlet 132 fluidly connected to the liquid hydrogen inlet 130. A liquid hydrogen pump 133 is fluidly connected to the liquid hydrogen inlet 130 of the heat exchanger 122 and operable to supply liquid hydrogen to the liquid hydrogen inlet 130. It is contemplated that any suitable liquid hydrogen supply can be used, for example, the liquid hydrogen can be pumped from aircraft cryogenic tanks 131 using the liquid hydrogen pump 133 mounted on an accessory pad (e.g. on an engine accessory gearbox), or the pump 133 may be driven externally by other means.

An expansion turbine 134 having a gas inlet 136 is fluidly connected to the gaseous hydrogen outlet 132 and a gas outlet 138 fluidly connected to the gas inlet 136, where the gas outlet 138 of the expansion turbine 134 is fluidly connected to the combustor 108 via conduit 139.

In certain embodiments, the compressor 104 includes a first stage (e.g. low pressure) compressor 140 and a second stage (e.g. high pressure) compressor 142. The second stage compressor 142 is in fluid communication with the first stage compressor 140 through an inter-stage duct 144. The heat exchanger 122 is fluidly connected to the primary gas path 106 between the adjacent first and second stage compressors 140, 142 such that the inter-stage duct 144 forms a compressor air conduit through the heat exchanger 122. For example, hot compressed air from the first stage compressor 140 passes through conduit 126 to the second stage compressor 142, where heat is exchanged in the heat exchanger 122 so that liquid hydrogen in the fluid conduit 128 is evaporated to gaseous hydrogen. This heat exchange serves the dual purpose of converting the liquid hydrogen 119 to gaseous hydrogen 121 to be used as fuel in the combustor 108, and while also cooling the air inlet 112 of the compressor 104, improving engine efficiency. The hydrogen (119, 121) and compressor air are in fluid isolation from each other throughout their respective passages (conduits 126, 138) in the heat exchanger 122 to avoid mixing of air and hydrogen in the heat exchanger 122, but are in thermal communication with one another for heat exchange between the hydrogen and compressor air in the heat exchanger 122.

The hydrogen expansion turbine 134 is positioned downstream of the heat exchanger 122 and upstream of the combustor 108 relative to hydrogen flow (119, 121). A rotatable element of the expansion turbine 134 (e.g. a turbine shaft 146) is operatively connected to a gearbox 148 (e.g. a reduction gearbox for a propeller, accessory gearbox, or the like) to input additional rotational power to the gearbox 128. More specifically, the expansion turbine shaft 146 is meshed with at least one gear 150 in the gearbox 148 such that when the liquid hydrogen 119 is converted to a gaseous state 121, the power from the expanding gas is extracted through the expansion turbine 134, driving the expansion turbine 134, adding additional rotational power to the gearbox 148. For example, the expansion turbine 134 is operatively connected to the main shaft 120 (e.g. via the gearbox 148 and output shaft 151) to drive the main shaft 120 in parallel with the turbine section 116. In this manner, the main shaft 120 is driven by combined power from the turbine section 116 and the expansion turbine 134. In certain embodiments, the hydrogen expansion turbine 134 can be operatively connected to one or both of an electrical power generator 152 to drive the electrical power generator 152, and an auxiliary air compressor 154 to drive the auxiliary air compressor 154.

In certain embodiments, a gaseous hydrogen accumulator 156 is disposed in conduit 139 downstream of the heat exchanger 122 relative to hydrogen flow, wherein the gaseous hydrogen accumulator 156 is between the heat exchanger 122 and the combustor 108. A gaseous hydrogen meter 158 is disposed in the conduit 139 downstream of the gaseous hydrogen accumulator 156 relative to hydrogen flow for controlling flow of hydrogen to the combustor 108, the gaseous hydrogen meter 158 being between the accumulator 156 and the combustor 108. After the gaseous hydrogen 121 is evaporated and extracted through the expansion turbine 134, the expanded low pressure gaseous hydrogen 121 is collected and stored in the gaseous hydrogen accumulator 156 and then regulated to a pressure where it can then be metered (e.g. via meter 158) to provide combustor ready hydrogen gas to the combustor 108.

In certain embodiments, a controller 160 is operatively connected to the gaseous hydrogen meter 158 and at least one sensor included in any of the gearbox 148, the hydrogen expansion turbine 134, and/or the turbine section 116. The controller 160 can include machine readable instructions that cause the controller to receive input 145 for a command power, receive input 147 from at least one of the gearbox 128, the hydrogen expansion turbine 134, and/or the turbine section 136, and adjust the flow of gaseous hydrogen 121 via the gaseous hydrogen meter 158 to achieve the command power, based on the input (e.g. signals 161, 162, 163, 164) received by the controller 160. In embodiments, the controller 160 can additionally receive input from a compressor pressure (e.g. P3 pressure, upstream of the accumulator 156) and input from the accumulator 156 downstream of the compressor pressure.

In yet another aspect of the present disclosure, there is provided a method. For example, the controller 160 can include machine readable instruction operable to execute the method. The method includes, supplying liquid hydrogen 119 to a heat exchanger 122 and expanding the liquid hydrogen 119 to gaseous hydrogen 121 with heat supplied to the heat exchanger 122, supplying the heat to the heat exchanger 122 with compressed air from a first stage compressor 140, where expanding the liquid hydrogen 119 to gaseous hydrogen 121 includes cooling the compressed air from the first stage compressor 140, compressing cooled air from the heat exchanger 122, and combusting the gaseous hydrogen 121 with the compressed cooled air in the combustor 108.

In embodiments, the method includes extracting power from a flow of gaseous hydrogen 121 with a hydrogen expansion turbine 134 downstream of the heat exchanger 122. In certain embodiments, the method includes combining power from the expansion turbine 134 with power from a main shaft 120 driven by a turbine section 116 to drive an output shaft 151 for example to generate thrust and/or electrical power. In certain embodiments, the method includes receiving input from at least one of the gearbox 148, the hydrogen expansion turbine 134, and/or the turbine section 116 (e.g. signals 161, 162, 163, 164) and outputting a command 165 to the gaseous hydrogen meter 158 to adjust flow of gaseous hydrogen 121 to the combustor 108 to achieve a command power output at the output shaft 151.

It is contemplated that a dual cycle intercooled architecture as described herein can be retrofit on an existing, conventional gas turbine engine. For example, any or all of a liquid hydrogen supply 124, heat exchanger 122, a gaseous hydrogen accumulator 156, a gaseous hydrogen meter 158, an expansion turbine 134 between the heat exchanger 122 and the gaseous hydrogen accumulator 156, can be introduced in an existing turbine engine. The system can then be connected as follows: connecting the liquid hydrogen supply 124 to the heat exchanger 122 via a liquid hydrogen pump 133 in a first line (e.g. fluid conduit 128), connecting the heat exchanger 122 to the expansion turbine 134 via a second line (e.g. an upstream portion of conduit 139), and connecting the expansion turbine 134 to the combustor via a third line (e.g. a downstream portion of conduit 139), wherein the gaseous hydrogen accumulator 156 and gaseous hydrogen meter 158 are disposed in the third line.

Figure 3:
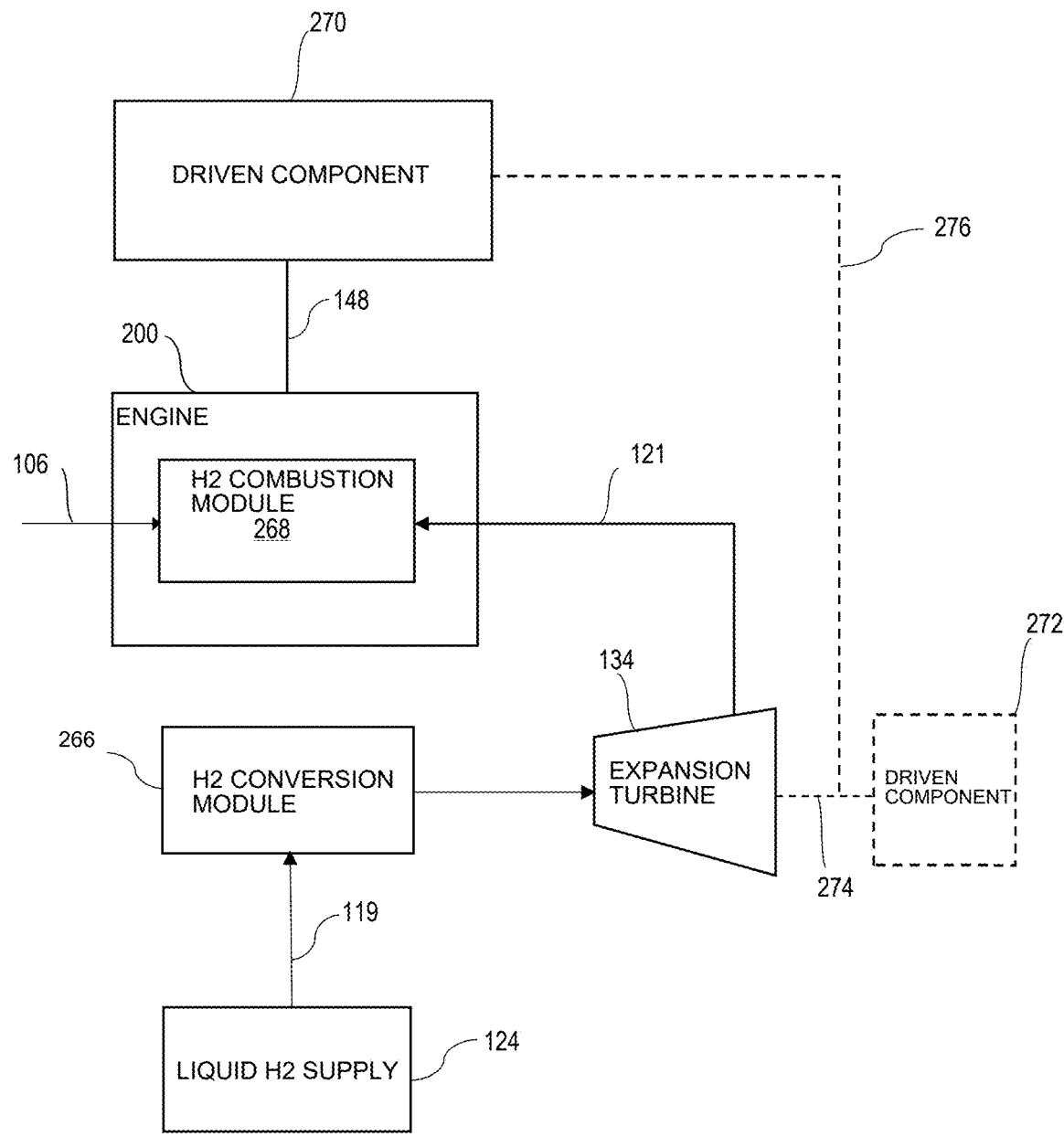
FIG. 3 is a schematic diagram of another embodiment of a gas turbine engine constructed in accordance with the present disclosure, showing another dual cycle intercooled engine architecture.

In certain embodiments, for example as provided in FIG. 3, an engine 200 can be similarly retrofit with similar architecture as in gas turbine engine 100. For brevity, the description of common elements that have been described above are not repeated. The engine 200 can be a hydrogen powered aircraft engine 200, for example the engine 200 can be a heat engine, a gas turbine engine, a reciprocating heat engine, a rotary heat engine, or the like. The engine 200 can be fed by primary gas path 106 (e.g. an air supply) and gaseous hydrogen 121.

The liquid hydrogen tank 131 is fluidly connected to the liquid hydrogen supply 124 for supplying hydrogen to a hydrogen conversion module 266.

The hydrogen conversion module 266 can be included within the engine 200, for combustion of hydrogen within the combustor 108. The hydrogen conversion module 266 is fluidly connected to the inlet 136 of the expansion turbine 134 for driving the expansion turbine 134. In certain embodiments, the hydrogen conversion module 266 can includes all of heat exchanger 122, liquid H2 pump 133, accumulator 156, and a meter 158. However, it is contemplated that the hydrogen conversion module 266 can be any suitable different combination of elements interconnected to be operable to provide a supply of gaseous hydrogen, for example a combination that is suitable to the particular engine with which the hydrogen conversion module 266 is used.

A hydrogen combustion module 268 can be fluidly connected to the outlet 138 of the expansion turbine 134 and operatively connected to the output shaft 151, for converting thermal energy into rotational energy to drive the output shaft 151. The engine 200 is operatively connected to a driven component 270 via the output shaft 151. The driven component 270 is driven by the output shaft 151 of the engine 200 and can be a rotor, for example, or any one of, or any combination of a propeller, a fan, a compressor, a gearbox, an electric generator, or the like. In certain embodiments, the expansion turbine 134 can optionally be operatively connected to another driven component 272 for driving the driven component 272 in series with driven component 270 via shaft 274. It is contemplated that the driven component 272 can be the same or different than driven component 270. It is also contemplated that the driven component 270 can be optionally operatively connected to driven component 272 via shaft 276 for driving driven component 272 in parallel with driven component 270.

With this method, the power generated by burning the hydrogen and then extracting the power through a power turbine is compounded by the power extracted by the expansion turbine and then combined through the gearbox. This architecture allows dual cycles of expansion and combustion of hydrogen with intercooling to be packaged within an existing turboprop nacelle loft, for example.

This architecture differs from other intercooled or expansion turbine engines in that it combines several engine improvements by making use of cold liquid hydrogen for cooling and expansion. The methods and systems of the present disclosure, as described above and shown in the drawings, provide for improved engine efficiency through intercooling. Additionally, inclusion of the expansion turbine allows for a smaller engine without sacrificing power output, therefore improving power to weight ratio. Carbon emissions may also be reduced or eliminated. Finally, this arrangement accomplishes these improvements in a compact package which would fit in existing nacelle loft lines (e.g. for a turboprop) therefore minimizing drag.

While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. A gas turbine engine (100), comprising:
a primary gas path (106) having, in fluid series communication: an air inlet (112), a compressor (104) fluidly connected to the air inlet, a combustor (108) fluidly connected to an outlet (114) of the compressor, and a turbine section (116) fluidly connected to an outlet (118) of the combustor section, the turbine section operatively connected to the compressor to drive the compressor;
an output shaft (151) operatively connected to the turbine section to be driven by the turbine section;
a heat exchanger (122) having:
a gas conduit (126) fluidly connected to the primary gas path, and
a fluid conduit (128) in fluid isolation from the gas conduit and in thermal communication with the gas conduit, the fluid conduit having a liquid hydrogen inlet (128) and a gaseous hydrogen outlet (132) fluidly connected to the liquid hydrogen inlet;
an expansion turbine (134) having a gas inlet (136) fluidly connected to the gaseous hydrogen outlet and a gas outlet (138) fluidly connected to the gas inlet, the gas outlet of the expansion turbine being fluidly connected to the combustor.

Clause 2. The gas turbine engine of Clause 1, further comprising a liquid hydrogen pump (133) fluidly connected to the liquid hydrogen inlet of the heat exchanger and operable to supply liquid hydrogen to the liquid hydrogen inlet of the heat exchanger.

Clause 3. The gas turbine engine of Clause 1, further comprising one or both of:
a gaseous hydrogen accumulator (156) downstream of the heat exchanger relative to hydrogen flow, wherein the gaseous hydrogen accumulator is between the heat exchanger and the combustor; and
a gaseous hydrogen meter (158) downstream of the gaseous hydrogen accumulator relative to hydrogen flow for controlling flow of hydrogen to the combustor, wherein the gaseous hydrogen meter is between the accumulator and the combustor.

Clause 4. The gas turbine engine of Clause 1, wherein the expansion turbine is operatively connected to the output shaft to drive the output shaft in parallel with the turbine section.

Clause 5. The gas turbine engine of Clause 4, further comprising a gearbox (148), and wherein the gear box is operatively connected to a main shaft (120) driven by the turbine section of the gas turbine engine, wherein the gearbox further includes an output shaft (151) driven by combined power from the turbine section and the expansion turbine.

Clause 6. The gas turbine engine of Clause 5, wherein the expansion turbine is operatively connected to one or both of: an electrical power generator (152) to drive the electrical power generator, and an auxiliary air compressor (154) to drive the auxiliary air compressor.

Clause 7. The gas turbine engine of Clause 1, wherein the compressor has multiple compressor sections and the gas conduit of the heat exchanger is fluidly connected to the primary gas path at a location between adjacent compressor sections of the multiple compressor sections, further comprising:
a gaseous hydrogen accumulator downstream of the heat exchanger relative to hydrogen flow, wherein the gaseous hydrogen accumulator is between the heat exchanger and the combustor;

a gaseous hydrogen meter downstream of the gaseous hydrogen accumulator relative to hydrogen flow for controlling flow of hydrogen to the combustor, wherein the gaseous hydrogen meter is between the accumulator and the combustor; and a hydrogen expansion turbine downstream of the heat exchanger and upstream of the combustor relative to hydrogen flow, wherein a turbine shaft of the hydrogen expansion turbine is operatively connected to a gearbox.

Clause 8. The gas turbine engine of Clause 7, wherein an outlet of the hydrogen expansion turbine is in fluid communication with the combustor to provide combustor ready hydrogen gas to the combustor and to add additional rotational power the gearbox, wherein the gear box is operatively connected to a main shaft driven by the turbine section of the gas turbine engine, wherein the gearbox further includes an output shaft driven by combined power from the turbine section and the expansion turbine.

Clause 9. The gas turbine engine of Clause 8, further comprising, a controller (160) operatively connected to the gaseous hydrogen meter and at least one sensor in any of the gearbox, the hydrogen expansion turbine, and/or the turbine section, wherein the controller includes machine readable instructions that cause the controller to:
   receive input for a command power;
   receive input from at least one of the gearbox, the hydrogen expansion turbine, and/or the turbine section
   receive input from compressor pressure;
   receive input from accumulator downstream pressure; and
   adjust the flow of gaseous hydrogen via the gaseous hydrogen meter to achieve the command power.

Clause 10. A gas turbine engine (100), comprising:
   a primary gas path (106) having, in fluid series communication: an air inlet (112), a compressor (104) fluidly connected to the air inlet, a combustor (108) fluidly connected to an outlet (114) of the compressor, and a turbine section (116) fluidly connected to an outlet (118) of the combustor, the turbine section operatively connected to the compressor to drive the compressor, wherein the compressor has multiple compressor sections;
   an output shaft (151) operatively connected to the turbine section to be driven by the turbine section;
   a heat exchanger (122) having:
      a gas conduit (126) fluidly connected to the primary gas path, and
      a fluid conduit (128) in fluid isolation from the gas conduit and in thermal communication with the gas conduit, the fluid conduit having a liquid hydrogen inlet (130) and a gaseous hydrogen outlet (132) fluidly connected to the liquid hydrogen inlet,
   wherein the gas conduit of the heat exchanger is fluidly connected to the primary gas path at a location between adjacent compressor sections of the multiple compressor sections.

Clause 11. The gas turbine engine of Clause 10, wherein the compressor, combustor, and turbine section are part of one of: a gas turbine engine, a reciprocating heat engine, and a rotary heat engine.

Clause 12. The gas turbine engine of Clause 10, further comprising a liquid hydrogen pump in fluid communication with the liquid hydrogen inlet of the heat exchanger; and wherein the combustor is also in fluid communication to receive hydrogen downstream of the heat exchanger relative to hydrogen flow for combustion of hydrogen and air.

Clause 13. The gas turbine engine of Clause 10 or 11, further comprising a hydrogen expansion turbine in fluid communication to receive hydrogen from the gaseous hydrogen outlet of the heat exchanger, the expansion turbine including a rotatable component operatively connected to the expansion turbine to be rotated by rotation of the expansion turbine, wherein the rotatable component is also operatively connected to a gearbox.

Clause 14. The gas turbine engine of Clause 13, wherein an outlet of the hydrogen expansion turbine is in fluid communication with the combustor to provide combustor ready hydrogen gas to the combustor and to add additional rotational power to the gearbox.

Clause 15. The gas turbine engine of Clause 10, further comprising:
   a gaseous hydrogen accumulator (156) downstream of the heat exchanger relative to hydrogen flow, wherein the gaseous hydrogen accumulator is between the heat exchanger and the combustor; and
   a gaseous hydrogen meter (158) downstream of the gaseous hydrogen accumulator relative to hydrogen flow for controlling flow of hydrogen to the combustor, wherein the gaseous hydrogen meter is between the accumulator and the combustor.

Clause 16. A method of operating an aircraft, comprising:
   expanding a flow of liquid hydrogen to a flow of gaseous hydrogen;
   extracting kinetic energy from the flow of gaseous hydrogen to rotate a rotatable component of the aircraft; and
   after the extracting, combusting the flow of gaseous hydrogen in a combustor of a gas turbine engine (100) of the aircraft, supplying the heat to a heat exchanger (122) with compressed air from a first stage compressor (140), wherein expanding the liquid hydrogen to gaseous hydrogen includes cooling the compressed air from the first stage compressor;
   compressing cooled air from the heat exchanger; and
   combusting the gaseous hydrogen in the compressed cooled air.

Clause 17. The method of Clause 16, further comprising, using rotation of the rotatable component, generating one or both of: thrust, and electrical power.

Clause 18. The method of Clause 16, wherein the component is a turbine (116) of the gas turbine engine and the method further includes generating thrust by rotating an output shaft (151) of the gas turbine engine using rotation of the turbine, wherein the generating the thrust includes converting the rotation of the turbine into a slower rotation of the output shaft; and
   wherein the expanding the flow of liquid hydrogen includes cooling a compressed airflow passing through the gas turbine engine to heat up the flow of liquid hydrogen.

Clause 19. A method of retrofitting a gas turbine engine with a dual cycle intercooled architecture, wherein retrofitting includes:
   introducing a liquid hydrogen supply (134);
   introducing a heat exchanger (122) to a duct between the first stage compressor (140) and the second stage compressor (142);
   introducing a gaseous hydrogen accumulator (156) and a gaseous hydrogen meter (158) between the heat exchanger and the second stage compressor,
   introducing an expansion turbine (134) between the heat exchanger and the gaseous hydrogen accumulator, the expansion turbine operatively connected to a gear box.

Clause 20. The method as recited in Clause 19, further comprising, connecting the liquid hydrogen supply to the heat exchanger via a liquid hydrogen pump (133) in a first line, connecting the heat exchanger to the expansion turbine via a second line, and connecting the expansion turbine to the second stage compressor via a third line, wherein the gaseous hydrogen accumulator and gaseous hydrogen meter are disposed in the third line.

What is claimed is:

1. A gas turbine engine, comprising:
a primary gas path having, in fluid series communication: a primary air inlet, a compressor fluidly connected to the primary air inlet, a combustor fluidly connected to an outlet of the compressor, and a turbine fluidly connected to an outlet of the combustor, the turbine operatively connected to the compressor to drive the compressor via a shaft;
a gearbox having a first input drivingly engaged by the shaft, a second input, and an output for driving a rotatable load;
a hydrogen expansion turbine drivingly engaged to the second input of the gearbox, the expansion turbine having an inlet and an outlet, the outlet fluidly connected to the combustor, the output of the gearbox driven by combined power from the hydrogen expansion turbine and the turbine;
a heat exchanger including an air conduit and a fluid conduit in fluid isolation from the air conduit and in thermal communication with the air conduit, the air conduit of the heat exchanger having an air conduit inlet fluidly connected with the compressor at a first location in the primary gas path and an air conduit outlet fluidly connected to the primary gas path at a second location downstream of the first location, the fluid conduit of the heat exchanger extending from a hydrogen inlet of the fluid conduit to a hydrogen outlet of the fluid conduit, the hydrogen inlet being fluidly connected to a source of hydrogen, the hydrogen outlet being fluidly connected to the inlet of the expansion turbine via a hydrogen conduit, the source of hydrogen fluidly connected to the combustor via the heat exchanger and via the expansion turbine; and
a hydrogen meter in the hydrogen conduit upstream of the combustor and downstream of the hydrogen outlet of the heat exchanger, the hydrogen meter controlling a flow of hydrogen to the combustor based at least in part on: an input for a command power; an input from the gearbox, the hydrogen expansion turbine or the turbine section; an input from a compressor pressure; and/or an input from a gaseous hydrogen accumulator downstream pressure.

2. The gas turbine engine of claim 1, comprising a compressor section fluidly connected to the primary air inlet and having a plurality of compressor stages, and wherein:
the compressor is a compressor stage of the plurality of compressor stages; and
at least the air conduit inlet of the heat exchanger is located between adjacent compressor stages of the plurality of compressor stages.

3. The engine of claim 1, comprising a pump operable to move hydrogen from the source of hydrogen to the combustor via the hydrogen conduit.

4. The engine of claim 3, wherein:
the source of hydrogen is a source of liquid hydrogen operable to provide a supply of liquid hydrogen to the fluid conduit of the heat exchanger; and
the pump is a liquid hydrogen pump disposed in the hydrogen conduit at a location that is fluidly upstream of the fluid conduit of the heat exchanger.

5. The engine of claim 4, wherein the heat exchanger and the liquid hydrogen pump are sized to convert a majority of the supply of liquid hydrogen into a supply of gaseous hydrogen.

6. The engine of claim 5, wherein the heat exchanger and the liquid hydrogen pump are sized to convert 90%-100% of the supply of liquid hydrogen into a supply of gaseous hydrogen, by volume.

7. The engine of claim 1, wherein the hydrogen conduit is defined in part by an expansion turbine at a location in the hydrogen conduit that is fluidly downstream of the fluid conduit of the heat exchanger.

8. The engine of claim 7, wherein the hydrogen conduit is defined in part by a gaseous hydrogen accumulator at a location in the hydrogen conduit that is fluidly downstream of the fluid conduit of the heat exchanger.

9. The engine of claim 8, wherein the gaseous hydrogen accumulator is fluidly downstream of the expansion turbine in the hydrogen conduit.

10. The engine of claim 1, wherein the gearbox is one of: a reduction gearbox, and an accessory gearbox.

11. A method of operating the gas turbine engine of claim 1 in an aircraft, comprising:
heating a flow of gaseous hydrogen in the heat exchanger with compressor discharge air;
extracting kinetic energy from the flow of gaseous hydrogen from the heat exchanger to rotate a rotatable component of the aircraft; and
after the extracting, combusting the flow of gaseous hydrogen with the compressor discharge air in the combustor of the gas turbine engine of the aircraft.

12. The method as recited in claim 11, further comprising:
expanding a flow of liquid hydrogen to a flow of gaseous hydrogen in the heat exchanger;
compressing cooled air from the heat exchanger;
wherein expanding the liquid hydrogen to gaseous hydrogen includes cooling the compressed air from a first compressor stage; and
supplying heat to the heat exchanger with compressed air from a second compressor stage.

13. The method of claim 12, further comprising, using rotation of the rotatable component, generating one or both of: thrust, and electrical power.

* * * * *